US010123203B2

(12) United States Patent
Gay

(10) Patent No.: US 10,123,203 B2
(45) Date of Patent: Nov. 6, 2018

(54) MECHANISM FOR THE CONTEXTUAL OBSCURING OF DIGITAL DATA

(71) Applicant: France Telecom, Paris (FR)

(72) Inventor: Julian Gay, San Francisco, CA (US)

(73) Assignee: ORANGE, Paris (FR)

(*) Notice: Subject to any disclaimer, the term of this patent is extended or adjusted under 35 U.S.C. 154(b) by 360 days.

(21) Appl. No.: 13/631,270

(22) Filed: Sep. 28, 2012

(65) Prior Publication Data
US 2013/0086225 A1 Apr. 4, 2013

Related U.S. Application Data

(60) Provisional application No. 61/541,824, filed on Sep. 30, 2011.

(51) Int. Cl.
G06F 15/16 (2006.01)
H04W 12/02 (2009.01)
(Continued)

(52) U.S. Cl.
CPC ............ H04W 12/02 (2013.01); G06Q 10/10 (2013.01); G06Q 50/01 (2013.01);
(Continued)

(58) Field of Classification Search
CPC ... G06F 21/31; G06F 3/0611; H04N 21/4668; G06Q 10/10; G06Q 50/01; H04L 63/0407; H04L 67/306; H04W 12/02; H04W 4/206
(Continued)

(56) References Cited

U.S. PATENT DOCUMENTS 5,493,692 A   2/1996 Theimer et al.
7,206,568 B2* 4/2007 Sudit .................... 455/404.1
(Continued)

FOREIGN PATENT DOCUMENTS

EP  2081394 A1  7/2009
WO 0175724 A1 10/2001

OTHER PUBLICATIONS

Melgani, F, Contextual reconstruction of cloud-contaminated multitemporal multispectral images, Feb. 2006, IEEE, IEEE transactions (vol. 44, Issue: 2), pp. 442-455.*
(Continued)

Primary Examiner — Tonia L Dollinger
Assistant Examiner — Dixon F Dabipi
(74) Attorney, Agent, or Firm — David D. Brush; Westman, Champlin & Koehler, P.A.

(57) ABSTRACT

A method and apparatus are disclosed for providing an attribute of a user profile to a requesting electronic device through a personal data server, the user profile being stored on a first electronic device of the user, the attribute pertaining to a data type characterized by a plurality of accuracy levels. The method includes for the personal data server receiving a request from the requesting electronic device for an attribute of the user profile, collecting the requested attribute from the first electronic device, comparing the user profile and a profile of the requesting electronic device, changing the accuracy level of the collected attribute based on the comparison to define an updated attribute, and providing the updated attribute to the requesting electronic device in response to the request.

14 Claims, 5 Drawing Sheets

(51) Int. Cl.
  *G06Q 10/10* (2012.01)
  *G06Q 50/00* (2012.01)
  *H04L 29/06* (2006.01)
  *H04W 4/21* (2018.01)
  *H04W 4/20* (2018.01)
  *H04L 29/08* (2006.01)

(52) U.S. Cl.
  CPC ........ *H04L 63/0407* (2013.01); *H04L 67/306* (2013.01); *H04W 4/206* (2013.01); *H04W 4/21* (2018.02)

(58) Field of Classification Search
  USPC ................. 709/219; 701/2, 300; 707/784
  See application file for complete search history.

(56) References Cited

U.S. PATENT DOCUMENTS

| | | | |
|---|---|---|---|
| 7,603,430 B1* | 10/2009 | Artz et al. | 709/217 |
| 8,468,103 B2* | 6/2013 | Galbreath et al. | 705/319 |
| 2003/0023726 A1* | 1/2003 | Rice | H04W 8/16 |
| | | | 709/225 |
| 2004/0127229 A1* | 7/2004 | Ishii | H04W 4/02 |
| | | | 455/456.1 |
| 2006/0136419 A1* | 6/2006 | Brydon | G06Q 10/107 |
| 2006/0282792 A1* | 12/2006 | Berrill | 715/781 |
| 2007/0186151 A1* | 8/2007 | Jyrinki | G06Q 10/109 |
| | | | 715/209 |
| 2008/0022201 A1* | 1/2008 | Chen | G06Q 10/109 |
| | | | 715/700 |
| 2008/0104679 A1* | 5/2008 | Craig | H04L 67/306 |
| | | | 726/4 |
| 2009/0024952 A1* | 1/2009 | Brush | G06Q 10/109 |
| | | | 715/781 |
| 2009/0030857 A1 | 1/2009 | Horvitz et al. | |
| 2010/0115426 A1* | 5/2010 | Liu | G06Q 10/107 |
| | | | 715/757 |
| 2011/0107434 A1* | 5/2011 | Chow et al. | 726/28 |
| 2012/0042392 A1* | 2/2012 | Wu | H04L 63/101 |
| | | | 726/28 |
| 2012/0254142 A1* | 10/2012 | Knowlton | G06T 11/206 |
| | | | 707/705 |
| 2012/0303360 A1* | 11/2012 | Grokop et al. | 704/201 |

OTHER PUBLICATIONS

Howard Jay Siegel, Philip H. Swain, Bradley W. Smith, Parallel Processing Implementations of a Contextual Classifier for Multispectral Remote Sensing Data, 1980, Pordue University Libraries.*
"Web Images to Get Expiration Date" BBC News—Technology, Jan. 20, 2011. www.bbc.co.uk/news/technology-12215921.
Mark Ward, "Fading Data Could Improve Privacy" BBC News—Technology, Jun. 16, 2010. www.bbc.co.uk/news/10324209.

* cited by examiner

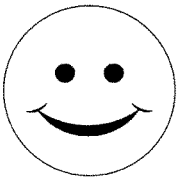
FIGURE 4A          FIGURE 4B

MECHANISM FOR THE CONTEXTUAL OBSCURING OF DIGITAL DATA

CROSS-REFERENCE TO RELATED APPLICATIONS

The present application is based on and claims the benefit of U.S. provisional patent application Ser. No. 61/541,824, filed Sep. 30, 2011, the content of which is hereby incorporated by reference in its entirety.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present system generally relates to the management of personal data in telecommunication networks, and more specifically to its dissemination over such networks.

BACKGROUND OF THE PRESENT DISCLOSURE

Communication devices, such as mobile phones or computers, have become important devices in our daily life. Such electronic devices can now all provide data connections. These connections may be enabled for instance through 3G or now 4G radio telecommunication networks, LAN or wireless network such as WiFi or WLAN networks.

Thanks to these data connections, users can exchange digital information, notably through the social networks such as Facebook™ or LinkedIn™. The digital information may comprise user personal information or data such as for instance name, age, home and work address, phone numbers, emails, pictures, work experience, daily blogging . . . Privacy associated to these personal data is becoming more and more of an issue.

Indeed, one of the properties of digital information is that it may be infinitely copied without loss. This property, while enabling the production and distribution of vast amounts of content, audio and video, also leads to privacy issues when personal data is concerned. Once persisted in digital form, personal data can be readily disseminated beyond the scope of its original disclosure.

Social networks have addressed that issue by defining access rules to personal data based on the social graphs. Provided a first user is tagged as a known user by a second user (notion of friends in the Facebook™ or contacts or connections on LinkedIn™), the first user will have access to the second user digital information, including his personal data.

Facebook™ has recently introduced the notion of different levels of connections, based for instance on how close the first user is to the second, like close friend, family, work friend . . . but the ranking of the connections is still based on user's input. Google Circle™ has also defined conditional access rules between users based on their Gmail™ correspondences.

Whether these access rules are based on user input or some ways of measuring the solidity of users connection, the rules will give full access to the personal data if matched. Then, nothing can prevent the friend or connection to freely disseminate these data. There is no existing solution today addressing the dissemination and the persistent character of personal data once in digital form.

Today there is still a need for a simple solution that allows a user to protect his personal data from dissemination. There is a further need for a solution that can be easily implemented to protect user personal data.

SUMMARY

An exemplary aspect of the present disclosure relates to a method for providing an attribute of a user profile to a requesting electronic device through a personal data server, the user profile being stored on a first electronic device of the user, the attribute pertaining to a data type characterized by a plurality of accuracy levels, the method comprising for the personal data server:
  receiving a request from the requesting electronic device for an attribute of the user profile,
  collecting the requested attribute from the first electronic device,
  comparing the user profile and a profile of the requesting electronic device,
  changing the accuracy level of the collected attribute based on the comparison to define an updated attribute,
  providing the updated attribute to the requesting electronic device in response to the request.

The present method enables personal data privacy by emulating the physical frailties of human memory, eye sight and hearing to obscure the accuracy of data dependent on the relative context or proximity between the observer (the person or electronic device requesting attributes of the user personal data) and the user (the originator or owner of the personal data).

As the attribute can be seen from different level of accuracy, the comparison determined between the observer and the user, through their respective profiles, will allow to select a level of accuracy to deliver this attribute. The more proximate the observer is to the user, the better access (level) it/he will be granted, i.e. consequently a more precise value of the actual attribute value.

The present system also relates to a personal data server for providing an attribute of a user profile to a requesting electronic device, the user profile being stored on a first electronic device of the user, the attribute pertaining to a data type characterized by a plurality of accuracy levels, the personal data server being arranged to:
  receive a request from the requesting electronic device for an attribute of the user profile,
  collect the requested attribute from the first electronic device,
  compare the user profile and a profile of the requesting electronic device,
  change the accuracy level of the collected attribute based on the comparison to define an updated attribute,
  provide the updated attribute to the requesting electronic device in response to the request.

The present system also relates to a telecommunication system comprising:
  a first electronic device storing a user profile, the user profile comprising at least one attribute pertaining to a data type characterized by a plurality of accuracy levels, a requesting electronic device characterized by a profile, and arranged to request an attribute of the user profile to the first electronic device, a personal data server for providing the requested attribute of the user profile to the requesting electronic device, the personal data server being arranged to:

receive the request for the attribute of the user profile, collect the requested attribute from the first electronic device, compare the user profile and the profile of the requesting electronic device, change the accuracy level of the collected attribute based on the comparison to define an updated attribute, provide the updated attribute to the requesting electronic device in response to the request.

The present system also relates to an application embodied on a computer readable medium and arranged to configure a processor to implement a method for providing an attribute of a user profile to a requesting electronic device through a personal data node, the user profile being stored on a first electronic device of the user, the attribute pertaining to a data type characterized by a plurality of accuracy levels, the personal data node comprising the processor, the application comprising instructions for:

receiving a request from the requesting electronic device for an attribute of the user profile, collecting the requested attribute from the first electronic device, comparing the user profile and a profile of the requesting electronic device, changing the accuracy level of the collected attribute based on the comparison to define an updated attribute, providing the updated attribute to the requesting electronic device in response to the request.

BRIEF DESCRIPTION OF THE DRAWINGS

The present system, call management node and method are explained in further detail, and by way of example, with reference to the accompanying drawings wherein:

FIGS. 4A and 4B are exemplary GUIs of user personal data as disclosed using the present system, and;

DETAILED DESCRIPTION OF THE PRESENT SYSTEM AND METHOD

Figure 1:
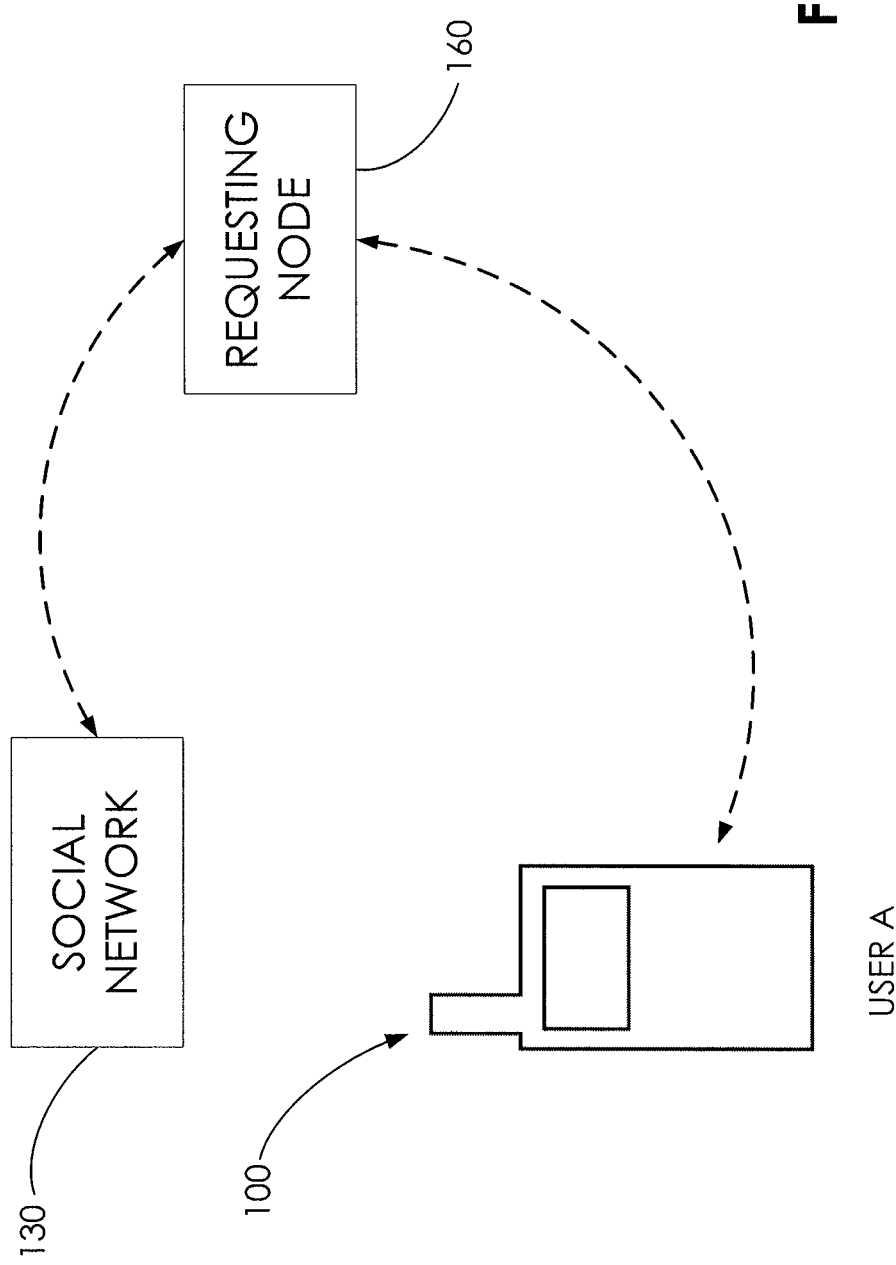
FIG. 1 shows an illustrative embodiment of known systems.

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, base stations, gateways or other entities in a telecommunication network are not detailed as their implementation is beyond the scope of the present system and method.

For purposes of simplifying a description of the present system, the terms "operatively coupled", "coupled", and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between such devices and/or portions thereof. In another example, an operative coupling may include a wired and/or wireless coupling to enable communication between an "observing" or requesting electronic device in a telecommunication network and a user device attached to a user.

Unless specified otherwise, the exemplary embodiment here after will be described in its application to a electronic device that can connect to a communication network such as the internet. The present exemplary embodiment is in no way a limitation of the scope of the present method and system as other telecommunications devices such tablets, desktop or laptop computers, or any other electronic device with data connectivity may be used by the man skilled in the art.

In addition, it should be expressly understood that the drawings are included for illustrative purposes and do not represent the scope of the present system.

The term rendering and formatives thereof as utilized herein refer to providing content, such as digital media or a graphical user interface (GUI), such that it may be perceived by at least one user sense, such as a sense of sight and/or a sense of hearing. For example, the present system may render a user interface on a display device so that it may be seen and interacted with by a user. The term rendering may also comprise all the actions required to generate a GUI prior to the display, like e.g. a map representation generated on a server side for a browser application on a user device.

A GUI is a type of user interface which allows a user to interact with electronic devices such as computers, handheld devices such as smartphones or tablets, household appliances, office equipment and the likes. GUIs are typically used to render visual and textual images which describe various visual metaphors of an operating system, an application, etc., and implemented on a processor/computer including rendering on a display device. Furthermore, GUIs can represent programs, files and operational functions with graphical images, objects, or vector representations. The graphical images can include windows, fields, dialog boxes, menus, icons, buttons, cursors, scroll bars, maps, etc. Such images can be arranged in predefined layouts, or can be created dynamically (by the device itself or by a web-based server) to serve the specific actions being taken by a user. In general, the user can select and/or activate various graphical images in order to initiate functions and tasks, i.e. controls, associated therewith. By way of example, a user can select a button that opens, closes, minimizes, or maximizes a window, or an icon that launches a particular application program. By way of another example, the GUI may present a typical user interface including a windowing environment and as such, may include menu items, pull-down menu items, icons, pop-up windows, etc., that are typical of those provided in a windowing environment, such as may be represented within a Windows™ Operating System GUI as provided by Microsoft Corporation and/or an OS X™ Operating System GUI, such as provided on an iPhone™, MacBook™, iMac™, etc., as provided by Apple, Inc., and/or another operating system.

An example of a GUI for a social network is illustrated in FIGS. 4A and 4B. The GUI may correspond to a user profile comprising different attributes such as profession, age, home address, birth date, work address, current location (if measured by a location enabled electronic device) and a picture. Such attributes of the user personal data pertain to data types associated with different level of accuracies. This is the case for instance for location, age, dates. By different level of accuracies, one means that such attributes may be seen through different level of zooms or precision, from precise (exact value) to less precise (range of value). An age may be scaled through different levels of accuracy as follows:
  Exact age
  Age range of 10 years, such as [0-10], [10-20], [20-30], . . .
  Child, adult, senior or retired
  Child, legal age.

Another way to see the levels of accuracy for each attribute is to describe these types of data as organized in a tree-like manner, from the less precise to the more precise. An attribute value at a given accuracy level (i.e. in a given branch of the data tree), will always fall within values associated with the next accuracy level. This is the example of existing location database. Such information is available for instance today to the man skilled in the art through the Gazetteer of the US Census Bureau (http://www.census.gov/cgi-bin/gazetteer) which lists all US locations and related zip codes. Other sources may include Geonames (www.geonames.org) which contains over eight million geographical names or landmarks, and consists of 6.3 million unique features whereof 2.2 million populated places and 1.8 million alternate names. All features are categorized into classes of different scales (county, region, country, . . . ) and further subcategorized into feature codes (size of the city, street, road, name of place, lake, forest, park, . . . ). In such a database, each street address will fall within a neighborhood district, itself falling into a county, then a region, then a state . . . as you go from a high level to a low level of accuracy. For instance a home address of 273 rue Saint Antoine, in Paris $1^{st}$ district may be seen as follows as one moves up (going to a lower level of accuracy) the tree of the location database:
  Street level: 273 rue Saint Antoine, 75001 Paris. France
  District level: Paris $1^{st}$
  City level: Paris
  Region level: Ile de France
  Country level: France
  Continent level: Europe.

The present system, enabled for instance through a personal data broker server, personal data broker in short, will allow to change the accuracy level of a user attribute based on a comparison of profiles between an observer (another user or a service through an electronic device) and the owner of the personal data.

The present system, embodied for instance as an online-service, uses the context of the observer to selectively obscure the accuracy of the data. The purpose of the service is to provide a privacy function that is already inherent in human-to-human interactions. For example, one might remember a family member's exact birthday, but one may find it more difficult to remember the date of an acquaintance's birthday, even though you attended last year. In this example the resolution of the information tends to degrade over time or through lack of intimacy, providing a form of privacy.

Once the comparison between the user profile and a profile associated with the observer is measured, the personal data broker will obscure the requested attribute using rules linking the level of accuracy of the attribute and the comparison.

Figure 2:
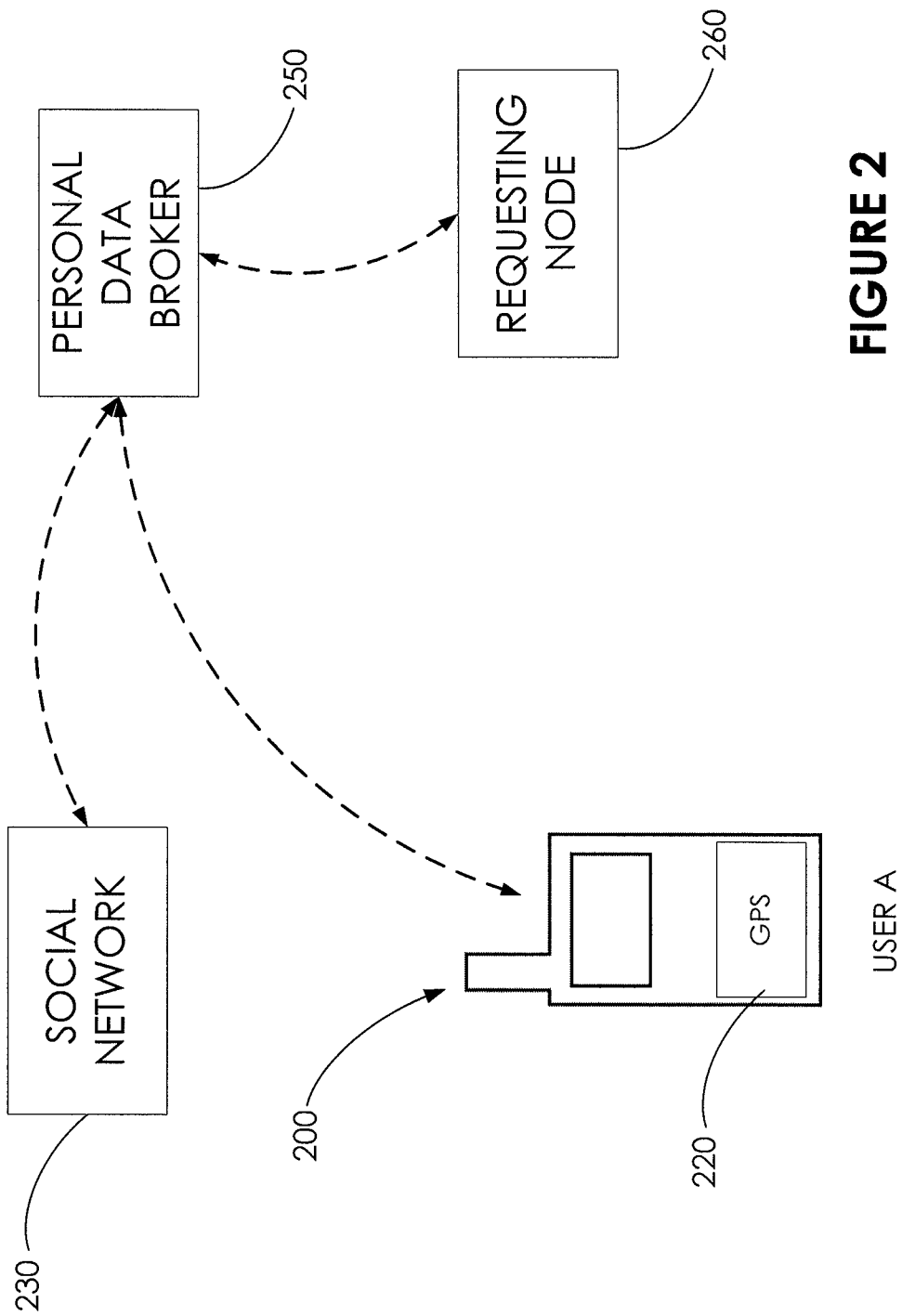
FIG. 2 is an illustrative embodiment of the present system

FIG. 2 is an illustration the present system. A user may store his personal data on a first electronic device 200, illustrated as a mobile device. Alternatively or additionally, he may store his personal data with an online service 230 (e.g. a social network server) he can connect to using the mobile device 200. The personal data may comprise different attributes of a user profile, some of them of a data type characterized by a plurality of accuracy level.

An observer, i.e. an observing or requesting node 260, such as another electronic device in the telecommunication network of the present system, may request an attribute of the user.

In existing solutions, as illustrated in FIG. 1, the observing node 160 will address the request for the given attribute directly to the user device 100. It may also send the request to the online service 130 provided a link (such as a connection of a friend) exists and is recognized between the observing node 160 and the user.

In the present system, the request for a user attribute may be sent or intercepted by a personal data broker node 250, offering for instance an online privacy service that filters third parties request for personal data, and obscure the accuracy of the returned user personal data as described here after. The personal data broker 250 may be stand alone node in the telecommunication network or a node coupled to a social network platform to provide the personal data obscuring service of the present system.

In order to change the accuracy level of the requested user attribute, the personal data broker 250 may have access to:
  the attribute itself, either obtained from the user device 200 directly or from the system where it is stored, like a social network 230 as seen on FIG. 2,
  contextual information about the observer, this may be for instance a time stamp associated to the request for the attribute, or a location of the requesting node 260. Location may be determined through the IP address of the requesting node or through a measured location if the requesting node is another location enabled device. More generally the contextual information for the observer 260 may be comprised or correspond to an observer profile with attributes characterizing this observing node 260,
  contextual information about the user. This may be for instance the time stamp associated to the attribute, i.e. the time it was posted by the user, or a validity time associated to it. It may also be the current location of the user (if his electronic device is location enabled) or his home address, a location based on his electronic device IP address (e.g. if he is using a desktop computer) . . . More generally the contextual information for the user may be comprised may be comprised or correspond to the user profile, or some attributes of it.

The contextual information for both the observer and the user may be used to determine a contextual distance or an access level that condition the accuracy level of the returned attribute. The contextual distance or access level may be seen as the metrics of the comparison between the observer and user's profiles, i.e. a measure of how close both parties are to one another. Depending of this closeness, the personal data broker will assess a level of accuracy for the requested attribute. In other words, using the contextual distance as the metrics, as the observer gets more distant from the user, it will get a less accurate attribute to its request. Using the access level as the metrics, as the observer gets less proximate to the user, its access levels gets lower, thereby limiting the precision it will get on the attribute.

The contextual information may cover other data linking both parties, such as social distance in a social network (degrees of separation between the user and the observer, if both are members of a social network).

Once in possession of the contextual information, the personal data broker 250 will determine this contextual distance or access level, between the user and the observer. This may be for instance the difference in locations between the observer and the user (or his electronic device), the difference in time between the time of the request and a time stamp associated to the attribute, a social distance in a social network. Other distances may be used for instance if both parties are members of a social network. A semantic tool may be used to compare various other attributes listed in the members profiles like movies, books, activities . . . Any weighted combination of the above may also be determined to get the access level. One may note that when the observer and the user are members of a social network, the contextual distance may be directly obtained from the degree of separations between these two members.

Figure 3:
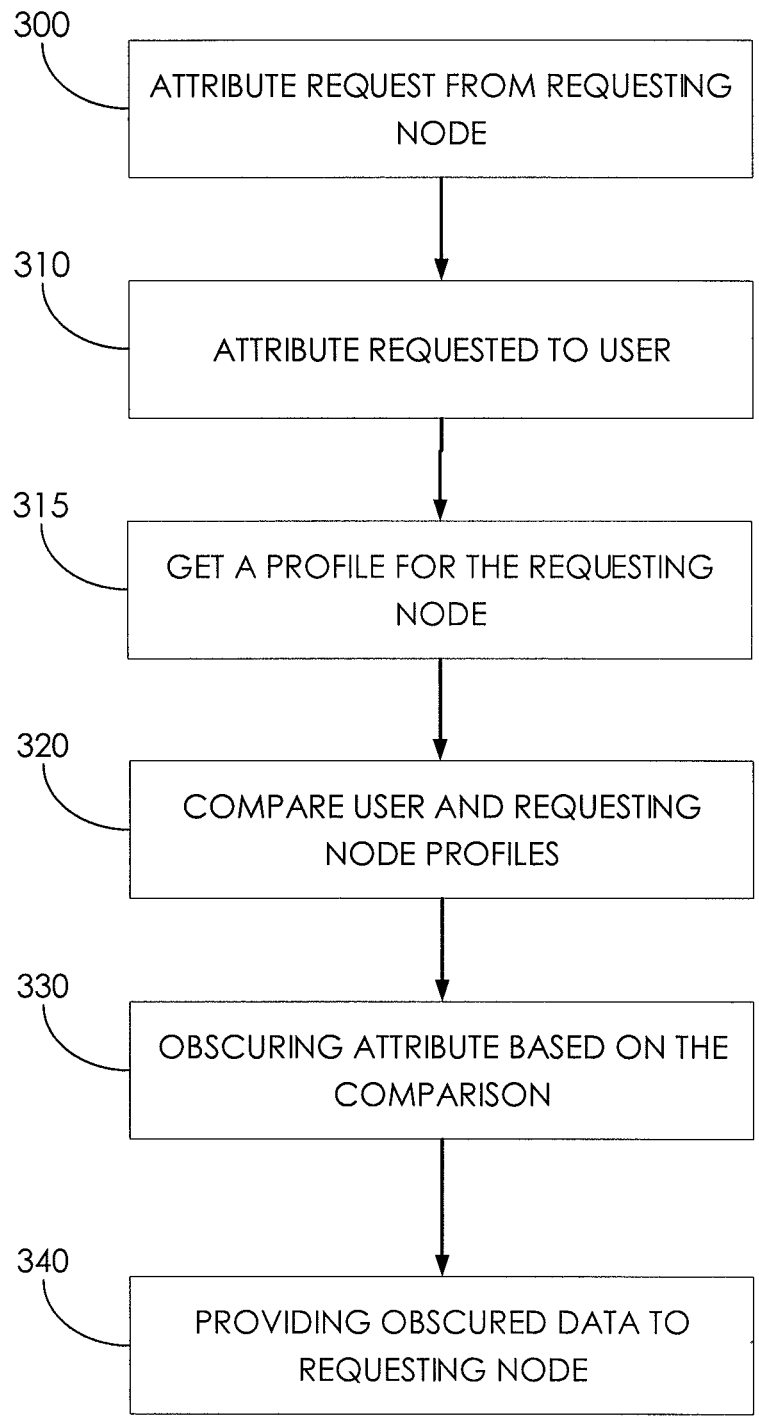
FIG. 3 is a flow chart illustrating an embodiment of the present method.

FIG. 3 illustrates an exemplary embodiment of the present method, as carried out by the personal data broker 250. In the present illustration, a requesting node 260 will request a given attribute from a first user A.

In a preliminary act 300, the broker node 250 will receive or intercept a request from the observing node 260 for a user attribute. This may be for instance a request for the user location or personal address or age, or any other filed of the user profile GUI as seen on examples of FIG. 4A or 4B. It will in a further act 310 collect the requested attribute from the first user; either through the user electronic device 200 or from an online service, like the social network the user A is a member of. It may additionally collect the user profile, or part of it, from the user electronic device 200 or the social network 230 (i.e. a server of the social network).

In a further act 315, it will collect a profile characterizing the requesting node 260. The requesting node profile may comprise or be completed with the time (stamp) of the request for the attribute. It may also comprise a location associated to the requesting node, like an exact location if the requesting node is a location enabled node, or a location corresponding to its IP address. The requesting node profile may also be a user profile provided the requesting node is e.g. a member of a social network or another user.

In a further act 320, the broker node 250 will compare the profiles of the user and the requesting node 260. One may note that the requesting node, either another user through his electronic device, or a node in the telecommunication network (like social network server 230), may be more generally seen as another electronic device (a server, a laptop or desktop computer, a pad, another mobile device . . .). As mentioned before, the comparison allows to measure the proximity between the user (requestee or observed user) and the observer (requester) either in terms of location, time or social distance (level of interaction, either user defined, or based on actual exchanges between users), or any other combination of attributes in the user and observer profiles. As illustrated in the examples here after, the comparison may be performed using the contextual distance or access level metrics.

To do so, the personal data broker 250 may compare one (or more) same attribute(s) between the observer and user profiles. It may calculate the contextual distance (or reversely the access level) based on just one same attribute (i.e. time stamp of data and request, location of devices, location of observer and home location of user . . .) or any weighted combination of several same attributes.

Each comparison of a same attribute may comprise using a specific scoring function, like the actual distance between the observer and user's locations, the time difference between the attribute creation and the observer's request, the similarities between listed activities. The contextual distance may be seen as an aggregation of the scoring functions applied to the parties' profiles.

In a further act 330, the personal data broker 250 will proceed with obscuring the requested attribute based on the comparison of the profiles. Obscuring comprises changing the accuracy level of the attribute. In order to do so, the different level of accuracy for each attribute may be associated to ranges or group of values for the contextual distance.

Tables 1 to 3 here after list examples of how the attributes may be obscured based on the values of the access level determined between the requester and the requestee.

TABLE 1 location as a function of the time distance

| Variable (Time) | Resolution | Example |
| --- | --- | --- |
| 0 to 1 day | Exact address | 801 Gateway Blvd, South San Francisco, CA 94080 |
| 1 day to 1 week | City level | South San Francisco, CA 94080 |
| 1 week to 1 month | State level | CA |
| 1 month or older | No information available | |

In Table 1, the variable considered to compare the user and observer's profiles is time, i.e. the time elapsed between the creation by the user and the request from the user. Based on the determined metrics (contextual distance or access level in act 320), and the level of accuracy or resolution associated to it (e.g. table 1), the broker node can extract from the collected attribute collected (act 310) an attribute value as or less precise.

Say the requested attribute is the address, and the request is made one day after publication of the user profile. the contextual distance, here the distance in time, is 1 day. The corresponding level of accuracy or resolution in table 1 is "exact address". The returned attribute will be the actual user address.

If the distance in time is 2 days, than the returned attribute will be South San Francisco as the level of accuracy for an contextual distance/access level of [1 day-1 week] is city level. The levels of resolution for the different attributes are associated to different values of contextual distances so as to introduce the idea that the requested attribute becomes less precise as the proximity between user and observer reduces (causing a reduced access level/increased contextual distance and a lesser level of accuracy).

Other examples are illustrated in the here after table 2 for the address as a function of the physical distance and table 3 for the age as a function of the same.

TABLE 2

| location as a function of the physical distance | | |
|---|---|---|
| Variable (Distance) | Resolution | Example |
| 0 to 1 mile | Exact address | 801 Gateway Blvd, South San Francisco, CA 94080 |
| 1 to 10 miles | City level | South San Francisco, CA 94080 |
| Same country | State level | CA |
| Difference country | No information available | |

TABLE 3

| location as a function of the physical distance | | |
|---|---|---|
| Variable (Distance) | Resolution | Example |
| 0 to 1 mile | Birthdate | Jan. 01, 1970 |
| 1 to 5 miles | Age | 41 |
| Citywide | Demographic | 40-50 |
| Statewide | Legal? | Legal |

One may note that to each different level of accuracy for an attribute corresponds a resolution (e.g. for the location attribute, resolutions may be city level, state or country level, and birthdate, age, demographic for the age attribute . . .). Each level of accuracy is further associated to an altering function so as to actually change the resolution of the collected attribute.

This altering function is applied to the collected attribute to change its accuracy level based on the result of the comparison of the user and observer's profiles. The altering function may comprise retrieving a group or range of values the collected attribute falls within. The retrieved group or range will be returned to the requesting node. For instance when the user attribute is his exact home location and the metrics for the comparison, e.g. the determined contextual distance or access level, points to a citywide distance, the associated function will look at the group of addresses that the attributes falls in, here his home city.

One may note that the requested attribute may be a media file, like a picture (see FIGS. 4A and 4B). Then the altering function may comprise downsizing the media file, so as to return a file with smaller resolution, thereby degrading its precision. Details in a picture could thereby be lost, protecting for instance faces or locations normally recognizable on the picture. The altering function may also be a dedicated function to alter patterns in a pic or a media file, like faces, names. . .

With a tree like organization of the attributes values, altering the accuracy level of an attribute may simply consist in looking at the larger range or category the attribute falls within. For instance, if the user's age is 40, it will fall within the [40-50] range, itself falling within the legal age.

In a further act 340, the obscured data, i.e. the altered attribute is presented to the observer, thus preserving the privacy of the user, i.e. the owner of the attribute.

FIGS. 4A and 4B illustrate exemplary GUIs of user profile as requested within one day (FIG. 4A) of creation or within 1 week (FIG. 4B) using the present system and the accuracy levels of Table 1. The personal data broker node 250 may be a node associated to the social network so as to control the dissemination of the users personal data. Display the user profile GUI corresponds to a request for one or more user attributes from a requesting node or observer. Provided the observing node 260 that places the request is proximate enough, the access level measured in act 320 of FIG. 3 will be replied by providing the exact attribute values. On FIG. 4A, the profile is first obtained as created by the user. For instance, his addresses (home, current, and work) and age are exact. Furthermore, other attributes such as political view or religion may actually be presented using the actual user values. A week later, as the contextual distance between the user and any requester has grown (e.g. comparison based on the temporal distance), the age resolution is now demographic and the addresses at city level (based for instance on rules of tables 1 to 3). The political views and religion are also obscured by presenting larger categories the initial values fall within.

Figure 5:
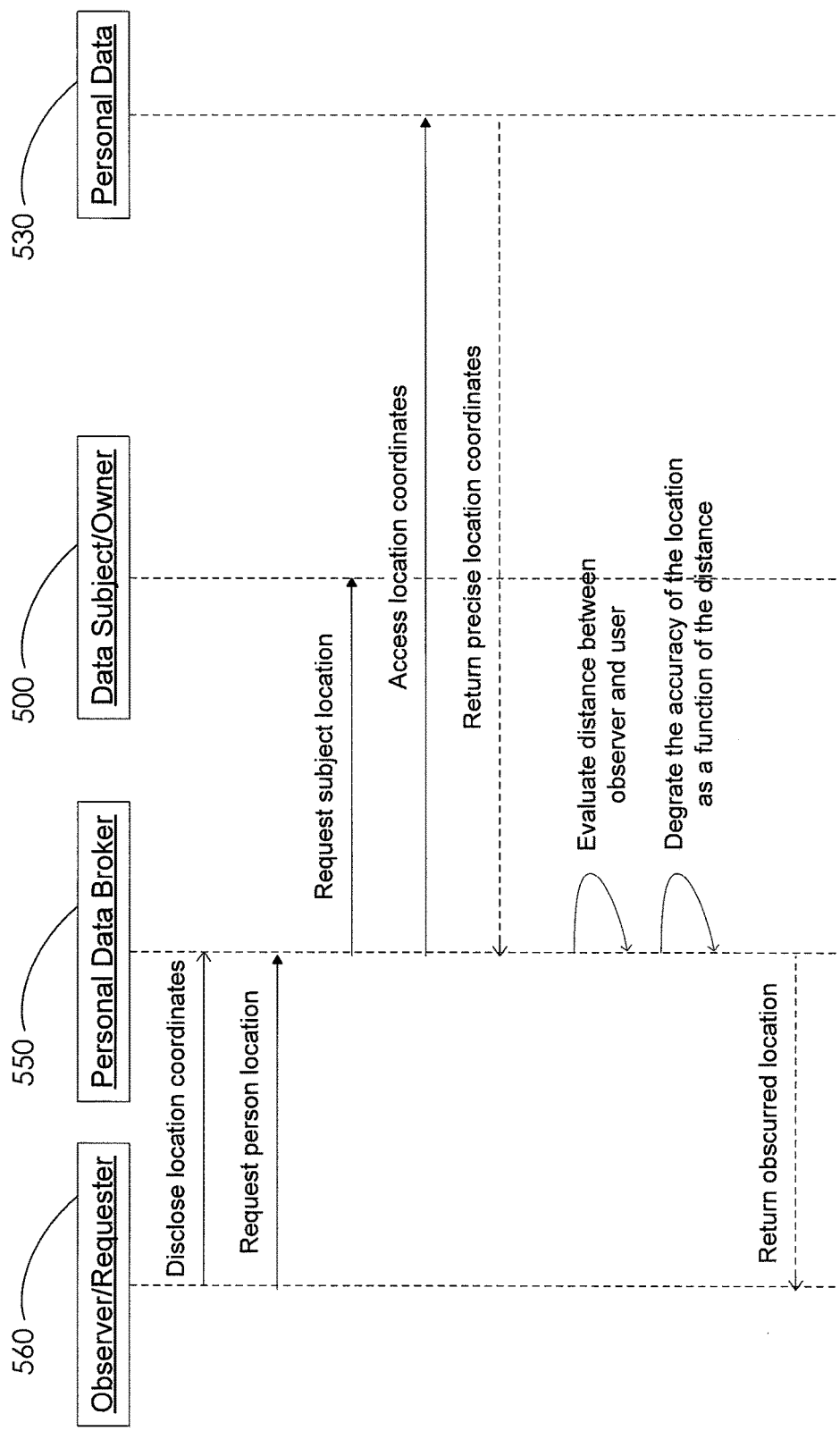
FIG. 5 is another flow chart illustrating a second embodiment of the present method.

FIG. 5 is another exemplary embodiment of the present method. This corresponds to an illustrative use case wherein the user 500 a member of a social network 530 storing his personal date. The observer 560 may be another user with a location enabled electronic device. With the request for the user 500 home location attribute, the observing node 560 will provide its own location to feed the personal data broker 550 with some attributes of the observer profile. The personal data broker 550 will then request the home location to the social network 530, either directly or through the user 500 for instance for security purposes. Using the returned precise coordinates for the user (this may be provided directly by the user device is location enabled), the broker 550 will evaluate a contextual distance between the observer and user. To do so, it will use some of the contextual information about both parties, in this example the location attribute. The measured contextual distance, or an access level corresponds to an accuracy level, as for instance known from the example of Table 1, The broker node can then degrade the precision of the user location (changing its scale) and return the updated/degraded attribute value to the observer.

In an exemplary embodiment of the present system, a processor and method are provided, which overcome disadvantages and/or make improvements in the prior art.

Although the present disclosure has been described with reference to one or more examples, workers skilled in the art will recognize that changes may be made in form and detail without departing from the scope of the disclosure and/or the appended claims.

What is claimed is:

1. A method comprising:
    receiving, by a personal data electronic device, a request from a requesting electronic device for an attribute of a user profile, wherein the attribute pertains to a data type characterized by a plurality of accuracy levels;
    collecting, by the personal data electronic device, the requested attribute from a first electronic device, which stores the user profile;
    comparing, by the personal data electronic device, the user profile and a profile of the requesting electronic device to define a contextual distance between the first electronic device and the requesting electronic device, wherein the contextual distance is:
        a difference in locations between the requesting electronic device and the first electronic device,
        a difference in time between a time of the request and a time stamp associated to the attribute,
        a comparison between various attributes listed in respective member profiles associated with the requesting electronic device and the first electronic device,
        or any combination thereof;

changing, by the personal data electronic device, the accuracy level of the collected attribute from a first one of the plurality of accuracy levels to a second one of the plurality of accuracy levels based on the contextual distance to define an updated attribute; and providing, by the personal data electronic device, the updated attribute to the requesting electronic device in response to the request.

2. A method according to claim 1, wherein the user profile comprises a time of creation of the user profile, the requesting electronic device profile comprising the time of the request, the comparing act comprising measuring a time difference between the time of creation and the time of the request, and the changing act comprising changing, by the personal data electronic device, the accuracy level of the collected attribute from the first one of the plurality of accuracy levels to the second one of the plurality of accuracy levels based on the measured time difference to define the updated attribute.

3. A method according to claim 1, wherein the user profile comprises a location for the user, the requesting electronic device profile comprising a location for the requesting electronic device, the comparing act comprising measuring a distance between the location of the user and the location of the requesting electronic device, and the changing act comprising changing, by the personal data electronic device, the accuracy level of the collected attribute from the first one of the plurality of accuracy levels to the second one of the plurality of accuracy levels based on the measured distance to define the updated attribute.

4. A method according to claim 3, wherein at least one of the first electronic device or the requesting electronic device is a location enabled electronic device, the method further comprising an act of getting an updated location for the location enabled electronic device.

5. A method according to claim 1, wherein the changing act further comprises the act of applying an altering function to the collected attribute to change its accuracy level from the first one of the plurality of accuracy levels to the second one of the plurality of accuracy levels.

6. A method according to claim 5, wherein the altering function comprises retrieving a group or range of values the collected attribute falls within.

7. A method according to claim 5, wherein the attribute is a media file having the first one of the plurality of accuracy levels and the altering function comprises downsizing the media file to the second one of the plurality of accuracy levels.

8. A personal data electronic device comprising:
an application embodied on a non-transitory computer readable medium and arranged to configure a processor of the personal data electronic device to:
receive a request from a requesting electronic device for an attribute of a user profile, wherein the attribute pertains to a data type characterized by a plurality of accuracy levels;
collect the requested attribute from a first electronic device, which stores the user profile;
compare the user profile and a profile of the requesting electronic device to define a contextual distance between the first electronic device and the requesting electronic device, wherein the contextual distance is:
a difference in locations between the requesting electronic device and the first electronic device,
a difference in time between a time of the request and a time stamp associated to the attribute,
a comparison between various attributes listed in respective member profiles associated with the requesting electronic device and the first electronic device,
or any combination thereof;
change the accuracy level of the collected attribute from a first one of the plurality of accuracy levels to a second one of the plurality of accuracy levels based on the contextual distance to define an updated attribute; and
provide the updated attribute to the requesting electronic device in response to the request.

9. A telecommunication system comprising:
a first electronic device;
a requesting electronic device; and
a personal data electronic device for providing an attribute of a user profile requested by the requesting electronic device, to the requesting electronic device, the user profile comprising at least one attribute pertaining to a data type characterized by a plurality of accuracy levels, the personal data electronic device comprising an application embodied on a non-transitory computer readable medium and arranged to configure a processor of the personal data electronic device to:
receive the request for the attribute of the user profile;
collect the requested attribute from the first electronic device;
compare the user profile and a profile of the requesting electronic device to define a contextual distance between the first electronic device and the requesting electronic device, wherein the contextual distance is:
a difference in locations between the requesting electronic device and the first electronic device,
a difference in time between a time of the request and a time stamp associated to the attribute,
a comparison between various attributes listed in respective member profiles associated with the requesting electronic device and the first electronic device,
or any combination thereof;
change the accuracy level of the collected attribute from a first one of the plurality of accuracy levels to a second one of the plurality of accuracy levels based on the contextual distance to define an updated attribute; and
provide the updated attribute to the requesting electronic device in response to the request.

10. An application embodied on a non-transitory computer readable medium and arranged to configure a processor of a personal data node to implement a method, the application comprising:
instructions for receiving a request from a requesting electronic device for an attribute of a user profile, wherein the attribute pertains to a data type characterized by a plurality of accuracy levels;
instructions for collecting the requested attribute from a first electronic device, which stores the user profile;
instructions for comparing the user profile and a profile of the requesting electronic device to define a contextual distance between the first electronic device and the requesting electronic device, wherein the contextual distance is:
a difference in locations between the requesting electronic device and the first electronic device,
a difference in time between a time of the request and a time stamp associated to the attribute, a comparison between various attributes listed in respective member profiles associated with the requesting electronic device and the first electronic device, or any combination thereof;

instructions for changing the accuracy level of the collected attribute from a first one of the plurality of accuracy levels to a second one of the plurality of accuracy levels based on the contextual distance to define an updated attribute; and instructions for providing the updated attribute to the requesting electronic device in response to the request.

11. A method according to claim 1, wherein the contextual distance is a difference in locations between the requesting electronic device and the first electronic device or a difference in time between a time of the request and a time stamp associated to the attribute.

12. A personal data electronic device according to claim 8, wherein the contextual distance is a difference in locations between the requesting electronic device and the first electronic device or a difference in time between a time of the request and a time stamp associated to the attribute.

13. A telecommunication system according to claim 9, wherein the contextual distance is a difference in locations between the requesting electronic device and the first electronic device or a difference in time between a time of the request and a time stamp associated to the attribute.

14. An application according to claim 10, wherein the contextual distance is a difference in locations between the requesting electronic device and the first electronic device or a difference in time between a time of the request and a time stamp associated to the attribute.

* * * * *